(12) United States Patent
Tian

(10) Patent No.: US 11,780,581 B2
(45) Date of Patent: Oct. 10, 2023

(54) QUICK DISASSEMBLING STRUCTURE AND UNMANNED AERIAL VEHICLE

(71) Applicant: Shandong Dingfeng Aviation Technology Co., Ltd., Jining (CN)

(72) Inventor: Yu Tian, Hong Kong SAR (CN)

(73) Assignee: SHANDONG DINGFENG AVIATION TECHNOLOGY CO., LTD., Shandong Province (CN)

( * ) Notice: Subject to any disclaimer, the term of this patent is extended or adjusted under 35 U.S.C. 154(b) by 245 days.

(21) Appl. No.: 17/220,921

(22) Filed: Apr. 1, 2021

(65) Prior Publication Data
US 2021/0309355 A1 Oct. 7, 2021

(30) Foreign Application Priority Data
Apr. 3, 2020 (CN) .......................... 202020479763.X

(51) Int. Cl.
| B64C 39/02 | (2023.01) |
| F16B 2/02 | (2006.01) |
| B64U 10/00 | (2023.01) |

(52) U.S. Cl.
CPC .............. *B64C 39/024* (2013.01); *F16B 2/02* (2013.01); *B64U 10/00* (2023.01)

(58) Field of Classification Search
CPC ........ B64U 20/40; B64U 50/19; B64U 50/34; B64C 2211/00; F16B 2001/0064; B64D 2041/005
See application file for complete search history.

(56) References Cited

U.S. PATENT DOCUMENTS

| 1,542,467 | A | * | 6/1925 | Moratta | .................. F16B 31/04 411/511 |
| 3,809,969 | A | * | 5/1974 | Williams | ............. H01R 25/006 361/728 |
| 4,802,863 | A | * | 2/1989 | Debus | ................... F16B 37/041 439/387 |
| 5,655,936 | A | * | 8/1997 | Meredith | ............... H01R 11/12 439/883 |
| 5,906,495 | A | * | 5/1999 | Morgan | ............... H01R 9/2483 439/92 |
| 2003/0057325 | A1 | * | 3/2003 | Carroll | .................. B64C 39/028 244/120 |
| 2011/0142567 | A1 | * | 6/2011 | Haylock | ................. F16B 33/06 411/360 |
| 2012/0234977 | A1 | * | 9/2012 | Kawahara | ................. B64C 3/34 244/131 |
| 2016/0164323 | A1 | * | 6/2016 | Tseng | ..................... F16M 13/00 248/122.1 |

(Continued)

*Primary Examiner* — Christopher D Hutchens
(74) *Attorney, Agent, or Firm* — WPAT LAW, P.C.; Anthony King

(57) ABSTRACT

A disassembling structure includes a first connecting piece, a second connecting piece and a guide and positioning piece; the guide and positioning piece is fixedly arranged on the first module; the second connecting piece is fixedly arranged on the second module; the second connecting piece and the guide and positioning piece are opposite to each other; the guide and positioning piece is attached to the outer side of the second connecting piece in a covering manner to guide and position the first module and the second module; the first connecting piece is detachably connected to the second connecting piece after passing through the guide and positioning piece.

2 Claims, 1 Drawing Sheet

(56) References Cited

U.S. PATENT DOCUMENTS

| | | | |
|---|---|---|---|
| 2016/0200207 A1* | 7/2016 | Lee | B60L 53/30 |
| | | | 244/17.23 |
| 2016/0244160 A1* | 8/2016 | Colten | B64C 39/024 |
| 2017/0015418 A1* | 1/2017 | Matus | B64C 39/024 |
| 2017/0276165 A1* | 9/2017 | Matsunami | B25B 13/48 |
| 2017/0300855 A1* | 10/2017 | Lund | G06Q 10/08 |
| 2018/0273158 A1* | 9/2018 | Courtin | B64C 1/26 |
| 2018/0362157 A1* | 12/2018 | Teetzel | B64U 30/20 |
| 2019/0276147 A1* | 9/2019 | Lee | B60L 53/12 |
| 2020/0377210 A1* | 12/2020 | McRoberts | B64C 39/024 |
| 2021/0237606 A1* | 8/2021 | McNair | B60L 53/665 |

\* cited by examiner

QUICK DISASSEMBLING STRUCTURE AND UNMANNED AERIAL VEHICLE

TECHNICAL FIELD

The utility model relates to the technical field of unmanned aerial vehicles, and particularly relates to a quick disassembling structure and an unmanned aerial vehicle.

BACKGROUND

With the rapid development of industrialization of unmanned aerial vehicles, the maturation of industrial chain supporting and the increasingly maturation of an unmanned aerial vehicle technology, in order to reduce the cost for human and material resources and reduce the environmental pollution, industrial unmanned aerial vehicles have begun to replace traditional operating methods in all walks of life.

At present, heavy-duty industrial unmanned aerial vehicles still have the following problems: an energy part of the unmanned aerial vehicle is generally integrated with a body. During replacement of the energy part, the body needs to be disassembled for replacement. This process requires additional disassembling tools, so that the replacement process is tedious and wastes time.

Therefore, there is an urgent need to provide a quick disassembling structure and an unmanned aerial vehicle to solve the above-mentioned problems in the prior art.

SUMMARY

One aim of the utility model is to provide a quick disassembling structure, which has simple structure, quick assembling and disassembling, and improved working efficiency.

Another aim of the utility model is to provide an unmanned aerial vehicle, which realizes quick disassembling of a body and an energy-load module, improves the replacement efficiency of the energy-load module, and saves the working time.

In order to achieve the above objectives, the utility model adopts the following technical solutions:

A quick disassembling structure is used for connecting a first module to a second module, and includes a first connecting piece, a second connecting piece and a guide and positioning piece; the guide and positioning piece is fixedly arranged on the first module; the second connecting piece is fixedly arranged on the second module; the second connecting piece is opposite to the guide and positioning piece; the guide and positioning piece is attached to the outer side of the second connecting piece in a covering manner to guide and position the first module and the second module; the first connecting piece is detachably connected to the second connecting piece after passing through the guide and positioning piece; the first connecting piece and the second connecting piece are electrically conducted; and the second module is used for providing energy to the first module.

As a preferred technical solution of the above-mentioned quick disassembling structure, the second connecting piece and the guide and positioning piece are both tapered, and the inner side wall of the guide and positioning piece is attached to the outer side wall of the second connecting piece.

As a preferred technical solution of the above-mentioned quick disassembling structure, the detachable connection mode includes threaded connection, interference fitting connection, hook connection or pin connection.

As a preferred technical solution of the above-mentioned quick disassembling structure, the first connecting piece and the second connecting piece are in threaded connection. A threaded hole is formed in one of the first connecting piece and the second connecting piece, and an external thread is arranged on the other one.

As a preferred technical solution of the above-mentioned quick disassembling structure, a counterbore hole is formed in the first module in a penetrating manner; the counterbore hole is coaxial with the guide and positioning piece; one end of the first connecting piece passes through the counterbore hole and the guide and positioning piece, and is connected with the second connecting piece; and the other end of the first connecting piece resists against a step surface of the counterbore hole.

As a preferred technical solution of the above-mentioned quick disassembling structure, the first connecting piece is a self-tightening screw, and the second connecting piece is a tapered nut.

As a preferred technical solution of the above-mentioned quick disassembling structure, a plurality of guide and positioning pieces are uniformly arranged on the first module along a circumference of a center axis of the first module; a plurality of second connecting pieces are uniformly arranged on the second module along a circumference of a center axis of the second module; and the guide positioning pieces and the second connecting pieces are disposed in a one-to-one correspondence manner.

As a preferred technical solution of the above-mentioned quick disassembling structure, four guide and positioning pieces and four second connecting pieces are provided.

An unmanned aerial vehicle includes a body and an energy-load module, and further includes the above-mentioned quick disassembling structure. The body is the first module, and the energy-load module is the second module; and the body is detachably connected to the energy-load module through the quick disassembling structure.

Compared with the prior art, the utility model has the advantages and beneficial effects:

The quick disassembling structure provided by the utility model includes the first connecting piece, the second connecting piece and the guide and positioning piece; the guide and positioning piece is fixedly arranged on the first module; the second connecting piece is fixedly arranged on the second module; the guide and positioning piece is attached to the outer side of the second connecting piece in the covering manner to guide and position the first module and the second module; the first connecting piece is detachably connected to the second connecting piece after passing through the guide and positioning piece; the first connecting piece and the second connecting piece are electrically conducted; the second module is used for providing energy to the first module; and therefore, quick detachable connection and circuit conduction between the first module and the second module are realized. The quick disassembling structure is simple and quick for assembling and disassembling, and the working efficiency is improved.

Compared with the prior art that the energy-load module can be replaced only by disassembling the body, the unmanned aerial vehicle provided by the utility model is that the body of the unmanned aerial vehicle is in detachable connection and circuit conduction with the energy-load module through the quick disassembling structure, so that quick disassembling on the working site is realized, the replacement efficiency of the energy-load module is improved, and the working time is saved.

Figure 1:
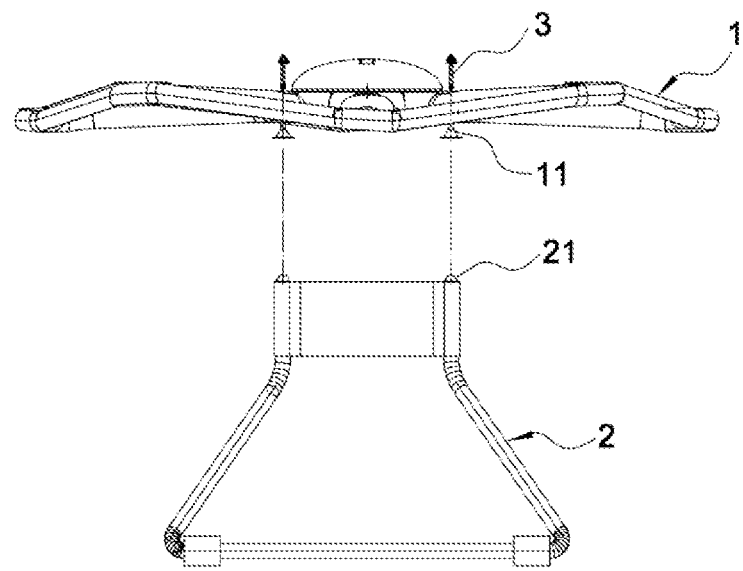
FIG. 1 is a schematic structural diagram illustrating that a body and an energy-load module of an unmanned aerial vehicle provided by a specific implementation mode of the utility model are unassembled.
Figure 2:
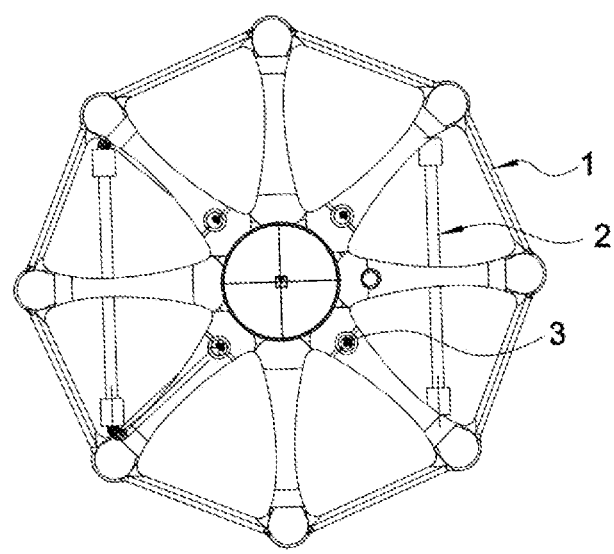
FIG. 2 is a top view of an unmanned aerial vehicle provided by a specific implementation mode of the utility model.

Reference signs in the drawings are as follows:

1: first module; 11: guide and positioning piece; 2: second module; 21: second connecting piece; 3: first connecting piece.

DESCRIPTION OF THE EMBODIMENTS

In order to make the technical problems solved by the utility model, the technical solutions adopted and the technical effects achieved clearer, the technical solutions of the utility model will be further explained below in conjunction with the accompanying drawings and specific implementation modes.

In the description of the utility model, unless otherwise clearly specified and defined, the terms "connected", "coupled", and "fixed" should be understood in a broad sense. For example, it can be a fixed connection, a detachable connection, or integration. It can be a mechanical connection or an electrical connection. It can be a direct connection, or an indirect connection through an intermediate medium. It can also be an intercommunication between two elements or the interaction between two elements. Those of ordinary skill in the art can understand the specific meanings of the above terms in the utility model according to specific situations.

In the utility model, unless otherwise clearly defined and defined, the first feature being "above" or "under" the second feature may include that the first and second features are in direct contact, or may include that the first and second features are not in direct contact but in contact through other features between them. Moreover, the first feature being "on", "at the upper side of" and "on the upper surface of" the second feature includes that the first feature is right above and at the oblique upper side of the second feature, or only indicates that the horizontal height of the first feature is greater than that of the second feature. the first feature being "below", "at the lower side of" and "on the lower surface of" the second feature includes that the first feature is right below and at the oblique lower side of the second feature, or only indicates that the horizontal height of the first feature is less than that of the second feature.

In the description of the utility model, orientations or positional relationships indicated by the terms "upper", "lower", "left", "right" and the like are orientations or positional relationships as shown in the drawings, and are only for the purpose of facilitating the description and simplifying the operation, instead of indicating or implying that devices or elements indicated must have particular orientations, and be constructed and operated in the particular orientations, so that these terms are not construed as limiting the utility model. In addition, the terms "first" and "second" are only used to distinguish the description and do not have special meanings.

This implementation mode discloses a quick disassembling structure, which can be applied to a first module 1 and a second module 2 that need to be quickly assembled or disassembled to improve the disassembling efficiency. For example, this implementation mode further discloses an unmanned aerial vehicle, including a body, an energy-load module and a quick disassembling structure. The body is a first module 1, and the energy-load module is a second module 2. The body realizes detachable connection and circuit conduction with the energy-load module through the quick disassembling structure.

As shown in FIG. 1, the above-mentioned quick disassembling structure includes a first connecting piece 3, a second connecting piece 21 and a guide and positioning piece 11. The guide and positioning piece 11 is fixedly arranged on the body; the second connecting piece 21 is fixedly arranged on the energy-load module; the second connecting piece 21 and the guide and positioning piece 11 are opposite to each other; the guide and positioning piece 11 is attached to the outer side of the second connecting piece 21 in a covering manner to guide and position the body and the energy-load module; the first connecting piece 3 is detachably connected to the second connecting piece 21 after passing through the guide and positioning piece 11; the first connecting piece 3 and the second connecting piece 21 are electrically conducted; and the energy-load module is used for providing energy to the body.

In a general case, the body is located above the energy-load module, so that the guide and positioning piece 11 is fixedly arranged at the bottom of the body, and the second connecting piece 21 is correspondingly fixedly arranged at the top of the energy-load module.

When it is necessary to replace the energy-load module, the first connecting piece 3 is loosened to separate the body from the energy-load module; during assembling of the replaced energy-load module and the body, the body is placed on the energy-load module to cause the guide and positioning piece 11 to be attached to the outer side of the second connecting piece 21 the a covering manner, and at this time, a relative position of the body and the energy-load module are determined; the first connecting piece 3 is detachably connected to the second connecting piece 21 after passing through the guide and positioning piece 11 from top to bottom; and the assembling of the body and the energy-load module is completed. Furthermore, the first connecting piece 3 and the second connecting piece 21 are electrically conducted, so that the circuit conduction of the body and the energy-load module can be realized while quick disassembling of the body and the energy-load module is realized, and the energy-load module provides energy to the body to meet a power supply requirement. After the energy-load module is removed for replacement, an external power supply may also charge the energy-load module for repeated use. Compared with the prior art that the energy-load module can be replaced only by disassembling the body, the unmanned aerial vehicle in the utility model is that the body of the unmanned aerial vehicle is in detachable connection and circuit conduction with the energy-load module through the above-mentioned quick disassembling structure, so that quick and simple disassembling on the working site is realized, the replacement efficiency of the energy-load module is improved, and the working time is saved. Furthermore, the quick disassembling structure is simple; no additional disassembling tools are used in the assembling and disassembling process; and the operation is simple and quick.

Further, the second connecting piece 21 and the guide and positioning piece 11 are both tapered, and the inner side wall of the guide and positioning piece 11 is attached to the outer side wall of the second connecting piece 21. Under this structure, the tapered slope can provide a guide effect to positioning of the guide and positioning piece 11 and the second connecting piece 21, realizing quick alignment between the body and the energy-load module, improving the disassembling efficiency and saving the working time.

More further, the detachable connection mode of the first connecting piece 3 and the second connecting piece 21 includes threaded connection, interference fitting connection, hook connection or pin connection. Preferably, this implementation mode is preferred that the first connecting piece 3 and the second connecting piece 21 are in threaded connection. A threaded hole is formed in one of the first connecting piece 3 and the second connecting piece 21, and an external thread is arranged on the other one. The threaded connection is easy to operate and is more convenient and quicker.

Preferably, the first connecting piece 3 is a self-tightening screw, and the second connecting piece 21 is a tapered nut; the head of the self-tightening screw is sleeved with a tightening handle to facilitate operating the self-tightening screw.

In order to realize connection between the first connecting piece 3 and the second connecting piece 21; a counterbore hole is formed in the body in a penetrating manner along a vertical direction; the counterbore hole is coaxial with the guide and positioning piece 11; one end of the first connecting piece 3 provided with the thread passes through the counterbore hole and the guide and positioning piece 11, and is in threaded connection with the second connecting piece 21; and the head of the first connecting piece 3 resists against a step surface of the counterbore hole to realize fixing of the body and the energy-load module.

In this implementation mode, a plurality of guide and positioning pieces 11 are uniformly arranged on the body along a circumference of a center axis of the body; a plurality of second connecting pieces 21 are uniformly arranged on the energy-load module along a circumference of a center axis of the energy-load module; and the guide positioning pieces 11 and the second connecting pieces 21 are disposed in a one-to-one correspondence manner. The uniform distribution mode can improve the uniformity of a connecting force, thus improving the connection stability of the body and the energy-load module.

Optionally, four guide and positioning pieces 11 and four second connecting pieces 21 are provided in this implementation mode. In actual application, the quantities of the guide and positioning pieces 11 and the second connecting pieces 21 may be selected according to a specific structure of the body, such as the quantity of wings, and the selection is based on the principle of neither affecting the structural strength of the wings nor affecting the connection strength.

The quick disassembling structure provided by this implementation mode is not limited to being applied to an unmanned aerial vehicle, and may also be applied to other equipment requiring quick disassembling between the first module 1 and the second module 2. This implementation mode no longer enumerates this in detail.

Obviously, the above-mentioned embodiments of the utility model are only for the purpose of clearly explaining the illustration made by the utility model, and are not intended to limit the implementation modes of the utility model. Those of ordinary skill in the art can further make other changes or modifications in different forms on the basis of the above-mentioned descriptions. It is unnecessary and may not enumerate all implementation modes here. Any modifications, equivalent replacements, improvements and the like that are made without departing from the spirit and the principle of the utility model shall fall within the scope of protection of claims of the utility model.

What is claimed is:

1. A multi-copter unmanned aerial vehicle having a quick disassembling structure, said multi-copter unmanned aerial vehicle consists of:
   a first module (1) having a center body and eight arms extending radially from the center body, wherein the eight arms all have a same length;
   eight straight connecting bars each of which is directly connected to a distal end of any two of said eight arms;
   a second module (2) having a main portion detachably connected to a bottom side of the first module;
   a first leg having a proximal end directly connected to the main portion of the second module (2);
   a second leg having a proximal end directly connected to the main portion of the second module (2);
   a horizontal bar directly connecting a distal end of the first leg to a distal end of the second leg;
   four first connecting pieces (3), wherein the four first connecting pieces are respectively disposed at a proximal end of each of four of said eight arms;
   a second connecting piece (21); and
   a guide and positioning piece (11);
   wherein the guide and positioning piece (11) is fixedly arranged on the first module (1);
   wherein the second connecting piece (21) is fixedly arranged on the main portion of the second module (2);
   wherein the second connecting piece (21) is disposed opposite to the guide and positioning piece (11);
   wherein the guide and positioning piece (11) is detachably attached to an outer side of the second connecting piece (21);
   wherein one of the four first connecting pieces (3) is detachably connected to the second connecting piece (21);
   wherein one of the four first connecting piece (3) and the second connecting piece (21) are electrically conducted; and
   wherein the second module (2) supplies energy to the first module (1).

2. The quick disassembling structure according to claim 1, wherein the second connecting piece (21) and the guide and positioning piece (11) are both tapered, and an inner side wall of the guide and positioning piece (11) is attached to an outer side wall of the second connecting piece (21).

\* \* \* \* \*